Sept. 26, 1950 C. J. VAN LOON 2,523,403

NEGATIVE FEEDBACK AMPLIFIER, INCLUDING AUTOMATIC VOLUME CONTROL

Filed Aug. 14, 1946

CAREL JAN VAN LOON
INVENTOR.

BY Fred M Vogel

AGENT.

Patented Sept. 26, 1950 2,523,403

UNITED STATES PATENT OFFICE 2,523,403

NEGATIVE FEEDBACK AMPLIFIER, INCLUDING AUTOMATIC VOLUME CONTROL

Carel Jan van Loon, Eindhoven, Netherlands, assignor to Hartford National Bank and Trust Company, Hartford, Conn., as trustee Application August 14, 1946, Serial No. 690,454
In the Netherlands November 13, 1942

Section 1, Public Law 690, August 8, 1946
Patent expires November 13, 1962

5 Claims. (Cl. 179—171)

This invention relates to an improvement in or modification of the invention described and claimed in U. S. Patent 2,352,956 of M. J. O. Strutt et al., issued July 4, 1944. In the said specification is described a circuit arrangement for the transmission of high frequency electric oscillations which contains at least one controlled discharge tube and is provided with an input oscillatory circuit tuned to the frequency of the oscillations to be transmitted, the input oscillatory circuit being so proportioned that the damping due to the natural losses of the circuit together with the natural input damping of the discharge tube and with the damping exerted by preceding parts of the circuit arrangement on the oscillatory circuit is less than is required in view of the width of the frequency band to be transmitted, the required supplementary damping being brought about by withdrawing energy from the oscillatory circuit by means of a negative feedback coupling and the feedback current or voltage being obtained from the circuit or circuits of one or more current-carrying electrodes which are so chosen that the negative feedback coupling also results in a decrease of the noise current in the output circuit.

In the circuit according to the prior specification the problem arises in what manner the amplification of the circuit can be controlled since if the amplification is controlled in the usual manner by changing the bias of the control grid the intensity of the negative feedback decreases when the amplification is reduced, with the result that the control becomes less effective and on the other hand the selectivity increases so that exactly on reception of powerful signal with which the amplification is low the selectivity is very high.

According to the invention, this drawback is obviated in that the circuit arrangement comprises at least two stages, the negative feedback coupling referred to before being used in the first uncontrolled stage and the amplification of the second stage being controlled as a function of the intensity of the signal to be transmitted.

In order to prevent the first stage from being overcharged in the case of powerful signals this stage preferably comprises in addition to the damping negative feedback referred to before a negative feedback by which the input oscillatory circuit is not damped or not substantially damped, since if in the reception of powerful signals the negative feedback is carried out solely as a damping feedback, the required feedback may be so intense under certain conditions that the selectivity becomes inadmissibly low. In this case, the damping negative feedback is so chosen that the desired frequency band is transmitted and the non-damping negative feedback is in addition so adjusted that the stage yields the desired comparatively low amplification.

This non-damping negative feedback may be brought about for example by an inductive coupling of the anode circuit and the control grid circuit. For this purpose, each of these circuits includes an inductance coil, these coils are coupled together and one of the two coils has connected in parallel with it a resistance whose value is low compared with the impedance of the coil. This resistance serves to ensure that the feedback coupling occurs in the correct phase. In this case, the coil in the control grid circuit is connected in series with the tuned oscillatory circuit.

The principal object of the present invention is to overcome the above-described drawback in a high-frequency amplifier of the type disclosed in the above-cited patent.

In such cases it is frequently desirable that means should be provided to neutralise the influence of the control grid-cathode capacity since this capacity may result in the non-damping negative feedback not acting in the correct manner that is to say that it nevertheless damps the input oscillatory circuit. In the case of inductive coupling of anode circuit and control grid circuit the control grid circuit has for example included in it a coil which by one of the ends is connected to the control grid and by the other end, with the interposition of a neutralising condenser, to the cathode of the tube, the tuned circuit being connected to a tapping of the coil. In this case, the resistance mentioned before should be connected in parallel with the coil in the anode circuit.

The present circuit arrangement is frequently such that use is made of a discharge tube containing two or more electrode systems, such for example as a triode-heptode in which an electrode system is included in the stage and the other system in the second stage. As such a discharge tube generally comprises internally connected cathodes it is desirable to provide means preventing the control of the amplification of the second stage from affecting the operation of the former stage. For this purpose, the fixed negative bias of the control grid of the non regulated stage may be obtained in known manner from a source of direct voltage, for example a battery. It is also possible, to produce this negative bias in the usual manner by means of a resistance bridged so far as high frequency currents are concerned, so long as this resistance has passing in it in addition to the anode currents of the two systems a supplementary direct current in the same direction as the anode currents. This prevents any variations of the anode current of the second system from giving rise to appreciable potential variations across the resistance bridged so far as high frequency currents are concerned, which might have a detrimental effect on the operation of the former stage.

In order that the invention may be clearly understood and readily carried into effect it will now be described more fully with reference to the accompanying drawing, in which some few embodiments are illustrated.

Figure 1:
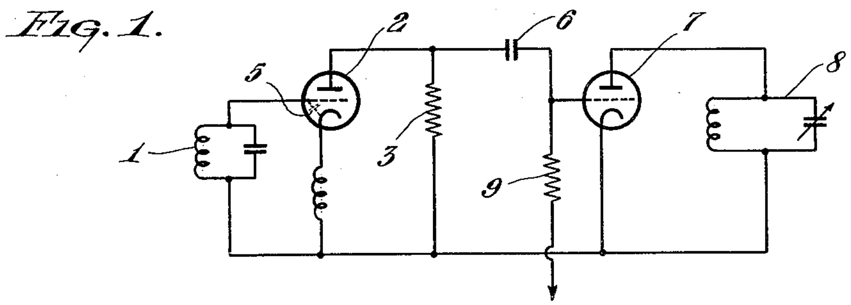
Fig. 1 is a schematic diagram of one embodiment of the invention.

Figure 1 shows an amplification circuit comprising two stages, means being used in the former stage for reducing the noise current, correlated with the cathode noise, in the output circuit. For the sake of clearness, the sources of direct voltage are omitted in the figure. An oscillatory circuit 1 tuned to the signal to be amplified is included in the control grid circuit of an amplifier valve 2. The anode circuit includes a resistance 3 from which the amplified voltage for the second stage can be obtained. The part of the cathode lead of the former stage which is common to the control grid circuit and the anode circuit includes an inductance coil 4. This coil has occurring across it a noise voltage correlated with the cathode noise and leading in phase by 90° with respect to the cathode noise current. This noise voltage brings about a current across the control grid-cathode capacity 5 (shown in dotted lines in the figure) which leads by 90° relatively to the voltage across the coil 4 and is therefore in antiphase with the cathode noise current. For those frequencies of the noise spectrum that are transmitted by the circuit arrangement the circuit 1 practically constitutes an ohmic resistance so that for these frequencies the circuit 1 has set up in it a noise voltage which is in antiphase with the cathode noise current. This noise voltage also occurs at the control grid of the tube 2 and thus contributes to the anode current which contribution is in antiphase with the cathode noise current so that the noise current correlated with the cathode noise in the anode circuit is decreased.

The value of the noise voltage set up across the circuit 1 is governed inter alia by the product of the capacity 5 into the inductance of the coil 4. The reduction of the noise current correlated with the cathode noise which is obtained in the anode circuit is consequently large according to the capacity 5 (in some cases by parallel connection of a supplementary condenser) and the inductance of the coil 4 is increased.

It must, however, be borne in mind that the coil 4 has occurring across it in addition to a noise voltage a signal voltage so that the input circuit has also supplied to it a signal current which is in antiphase with the signal voltage occurring across this circuit or in other words the presence of the coil 4 brings about a supplementary damping of the circuit 1 and the suppression of the cathode noise can consequently not be continued beyond the extent admissible in view of the supplementary damping incidental thereto.

The said supplementary damping brings about a decrease of the signal voltage occurring across the input oscillatory circuit and this has the effect of reducing the signal current in the output circuit to the same extent as the noise current correlated with the cathode hiss. The signal to noise ratio is consequently not changed by the measure described, whereas the damping of the circuit 1 has greatly increased. The circuit arrangement described consequently permits of obtaining the same favourable signal to noise ratio by means of a highly damped input circuit as is obtainable by means of a highly selective circuit.

The voltage amplified in the former stage is obtained from the resistance 3 and supplied via a coupling condenser 6 to the control grid of the tube 7. The anode circuit of this tube includes an oscillatory circuit 8 which is tuned to the signal to be transmitted and from which the output voltage of the amplifier circuit is obtainable. The tube 7 is controlled by means of a control voltage for automatic volume control which is supplied to the control grid via the resistance 9 and whose value depends on the intensity of the signal to be transmitted. Now, if the amplification of the second stage, that is to say of the tube 7, is controlled this does not exercise any effect on the operation, particularly on the negative feedback and the selectivity associated therewith of the former stage.

Figure 2:
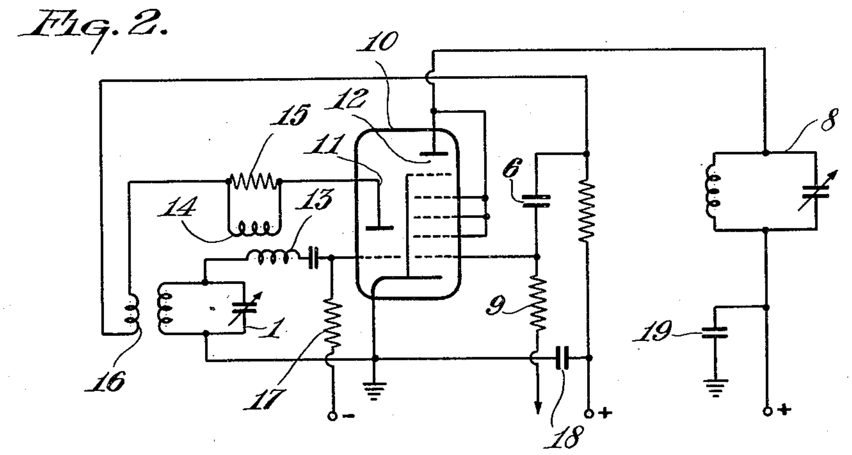
Fig. 2 is a schematic diagram of another embodiment of the invention.

Figure 2 shows a circuit arrangement in which use is made of a triode-heptode 10 whose triode part 11 is used in the former stage, whereas the heptode part 12 is used in the second stage. The control grid circuit of the former stage has included in it in series with the oscillatory circuit 1 an inductance coil 13 which is coupled to an inductance coil 14 included in the anode circuit of the triode 11. The inductance coil 14 has connected with it in parallel a resistance 15 whose value is low compared with the impedance of the coil. In series with this parallel combination is further included a coil 16 which is coupled to the oscillatory circuit 1. Now, the damping negative feedback is brought about by coupling the coil 16 to the oscillatory circuit 1, whereas the non damping feedback coupling is brought about by the coupling between the coils 13 and 14. The resistance 15 serves to ensure that the feedback is brought about in the correct phase. The voltage amplified in the former stage is obtained from the resistance 3 and is supplied to the first control grid of the heptode part via a coupling condenser 6. The two screening grids and the second control grid of the heptode system are connected to the anode in order to prevent distribution noise from occurring in the anode circuit. The suppressor grid is connected to the cathode in the usual manner.

Via a resistance 17 the control grid of the triode part is given a fixed negative bias which is obtained from a source of direct voltage, for example a battery. The control grid of the heptode part 12 has supplied to it via a resistance 9 a control voltage which controls the amplification of the second stage as a function of the magnitude of the signal to be transmitted.

The anode circuits of the triode and the heptode systems are earthed so far as high frequency currents are concerned by means of condenser 18 and 19 respectively. It is at once clear from the circuit arrangement that the control of the amplification of the second stage does not exercise any effect on the operation, particularly on the selectivity of the former stage.

Figure 3:
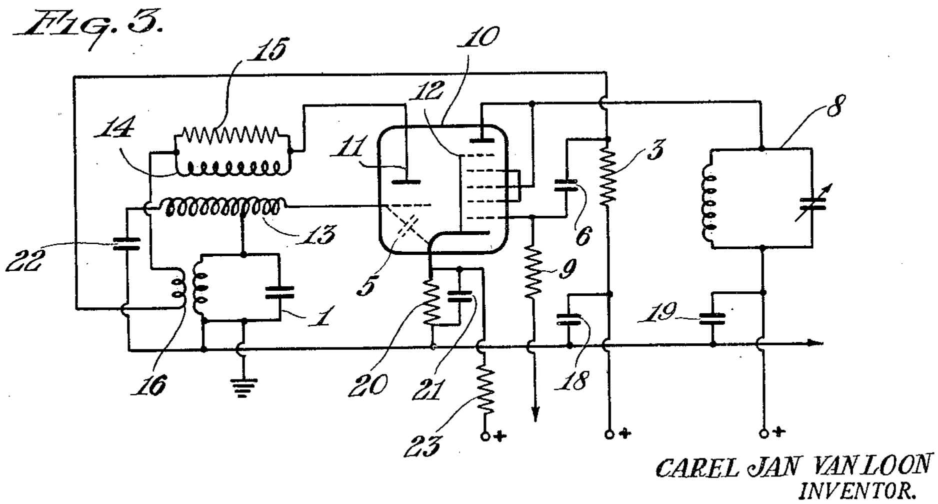
Fig. 3 is a schematic diagram of yet another embodiment of the invention.

Figure 3 shows a circuit arrangement in which use is also made of a triode-heptode 10 and which comprises means to neutralise the influence of the control grid-cathode capacity of the triode part.

For this purpose the coil 13 included in the control grid circuit of the triode part 11 is connected to the control grid concerned and on the other hand via a neutralising condenser 22 to the cathode. The input oscillatory circuit 1 is connected to a tapping of this coil. The influence of the control grid-cathode capacity 5 shown in dotted lines in the figure is wholly neutralised in this manner.

In addition in the circuit arrangement shown in Figure 3 the fixed negative bias of the control grid of the triode system is obtained in the usual manner by means of a resistance 20 in the cathode lead which is shunted by a condenser 21 so far as high frequency currents are concerned.

In order to prevent any variation in the anode current of the heptode system from altering the fixed negative bias of the triode system in an inadmissible manner a supplementary direct current is passed through the resistance 20 in the same direction as the two anode currents, this supplementary current being preferably heavy compared with the anode currents. For this purpose, the cathode is connected, with the interposition of a resistance 23, to a suitable chosen positive direct voltage, the resistance 20 being so proportioned that the potential drop set up across this resistance by the two anode currents and the supplementary direct current has the desired value.

What I claim is:

1. A circuit arrangement for the transmission of high-frequency electrical oscillations of varying intensity comprising a first amplifying stage including an electron discharge system provided with a cathode, a signal grid and an anode, a tuned input circuit and an output circuit connected respectively to said signal grid and said anode, a first negative feedback circuit intercoupling said input and output circuits and arranged to apply noise voltages from said output circuit degeneratively to said input circuit to thereby increase the damping of the input circuit without decreasing the signal to noise ratio and an additional negative feedback means intercoupling said input and output circuit and arranged to reduce the amplification of said first amplifying stage without affecting the damping of said input circuit, and a second amplifying stage including an electron discharge system provided with a cathode, a signal grid and an anode, means coupling the signal grid to the output circuit of said first amplifying stage, an output circuit connected to the anode and tuned to the oscillations to be transmitted, and means to control the amplification of said second stage as a function of the intensity of said oscillations, the amplification of said first stage being maintained constant, said first negative feedback circuit and said additional feedback means being independent of said second amplifying stage.

2. An arrangement as set forth in claim 1 wherein said additional negative feedback means is constituted by two mutually coupled inductors one of which is interposed between the signal grid and the input circuit and the other between the anode and the output circuit, and a resistance connected across said other of said inductors and having a value which is low relative to the impedance of said inductor.

3. An arrangement as set forth in claim 1 wherein said first negative feedback means is constituted by a coil interposed between said anode and said output circuit, said coil being inductively coupled to said input circuit.

4. A circuit arrangement for the transmission of high-frequency electrical oscillations of varying intensity comprising a first amplifying stage including an electron discharge system provided with a cathode, a signal grid and an anode, a tuned input circuit and an output circuit connected respectively to said signal grid and said anode, a coil inductively coupled to said input circuit, two mutually coupled inductors one of which is interposed between the signal grid and the input circuit and the other of which is interposed in series with said coil between the anode and the output circuit and a resistance connected across said other of said inductors and having a value which is low relative to the impedance of said inductor, said coil and said inductors being arranged to provide negative feedback, and a second amplifying stage including an electron discharge system provided with a cathode, a signal grid and an anode, means coupling the signal grid to the output circuit of said first amplifying stage, a tuned output circuit connected to the anode and means to control the amplification of said second stage as a function of the intensity of said oscillations, the amplification of said first stage being maintained constant.

5. A circuit arrangement for the transmission of high-frequency electrical oscillations of varying intensity comprising a first amplifying stage including an electron discharge system provided with a cathode, a signal grid and an anode, a capacitor, two mutually coupled inductors one of which is connected to said grid and through said capacitor to said cathode, a tuned input circuit connected between an intermediate point in said one inductor and said cathode, a coil inductively coupled to said input circuit, an output circuit connected in series with said coil and the other of said inductors to the anode and a resistance connected across said other of said inductors and having a value which is low relative to the impedance of said inductor, said capacitor having a value at which the effect of the internal cathode-grid capacitance of the discharge system is neutralized, said coil and said inductors being arranged to provide negative feedback, and a second amplifying stage including an electron discharge system provided with a cathode, a signal grid and an anode, means coupling the signal grid to the output circuit of said first amplifying stage, an output circuit connected to the anode and tuned to the oscillations to be transmitted, and means to control the amplification of said second stage as a function of the intensity of said oscillations, the amplification of said first stage being maintained constant.

CAREL JAN VAN LOON.

REFERENCES CITED

The following references are of record in the file of this patent:

UNITED STATES PATENTS

| Number | Name | Date |
|---|---|---|
| 2,144,921 | Hunt | Jan. 24, 1939 |
| 2,281,238 | Greenwood | Apr. 28, 1942 |
| 2,294,328 | Aldous | Aug. 25, 1942 |
| 2,315,042 | Boucke | Mar. 30, 1943 |
| 2,352,956 | Strutt | July 4, 1944 |

FOREIGN PATENTS

| Number | Country | Date |
|---|---|---|
| 634,666 | Germany | Sept. 3, 1936 |